(12) United States Patent
Kim

(10) Patent No.: US 9,819,002 B2
(45) Date of Patent: Nov. 14, 2017

(54) RECHARGEABLE BATTERY AND RECHARGEABLE BATTERY MODULE INCLUDING THE SAME

(71) Applicant: SAMSUNG SDI CO., LTD., Yongin-si, Gyeonggi-do (KR)

(72) Inventor: Duk-Jung Kim, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 196 days.

(21) Appl. No.: 14/021,013

(22) Filed: Sep. 9, 2013

(65) Prior Publication Data

US 2014/0308568 A1    Oct. 16, 2014

(30) Foreign Application Priority Data

Apr. 16, 2013 (KR) .................. 10-2013-0041725

(51) Int. Cl.
*H01M 2/30* (2006.01)
*H01M 2/04* (2006.01)
*H01M 2/20* (2006.01)

(52) U.S. Cl.
CPC ........... *H01M 2/30* (2013.01); *H01M 2/0473* (2013.01); *H01M 2/202* (2013.01)

(58) Field of Classification Search
CPC .......... H01M 2/30; H01M 2/06; H01M 2/202; H01M 2/0473
See application file for complete search history.

(56) References Cited

U.S. PATENT DOCUMENTS

| 2002/0132522 A1* | 9/2002 | Miyazaki | H01R 13/74 439/559 |
| 2008/0063929 A1* | 3/2008 | Byun | H01M 2/202 429/121 |
| 2011/0159353 A1 | 6/2011 | Byun et al. | |
| 2011/0195296 A1 | 8/2011 | Kim et al. | |

(Continued)

FOREIGN PATENT DOCUMENTS

| JP | 2003-077442 A | 3/2003 |
| JP | 2003-249207 A | 9/2003 |
| JP | 2008-146943 A | 6/2008 |

(Continued)

OTHER PUBLICATIONS

Korean Office Action dated Jul. 20, 2016 in Corresponding Korean Patent Application No. 10-2013-0041725.

(Continued)

*Primary Examiner* — Nicholas P D'Aniello
*Assistant Examiner* — Ling R Zeng
(74) *Attorney, Agent, or Firm* — Lee & Morse, P.C.

(57) ABSTRACT

A rechargeable battery and a rechargeable battery module, the rechargeable battery including an electrode assembly; a case accommodating the electrode assembly; a cap plate closing and sealing an opening of the case; and electrode terminals electrically connected to the electrode assembly and disposed in terminal holes of the cap plate, at least part of the electrode terminals being exposed outside of the cap plate, wherein each of the electrode terminals includes a base portion facing the cap plate; and a coupling portion protruding from at least one part of a top of the base portion, the coupling portion being coupleable to a bus bar by press-fitting.

15 Claims, 13 Drawing Sheets

(56) References Cited

U.S. PATENT DOCUMENTS

2011/0244317 A1* 10/2011 Lee .................... H01M 2/0473
429/182
2012/0288744 A1 11/2012 Guen

FOREIGN PATENT DOCUMENTS

| JP | 2010-061962 A | 3/2010 |
| JP | 2012-238562 A | 12/2012 |
| KR | 10-2011-0076738 A | 7/2011 |
| KR | 10-2011-0092042 A | 8/2011 |

OTHER PUBLICATIONS

Office Action dated Jan. 31, 2017 of the corresponding Korean Patent Application No. 10-2013-0041725.
Korean Notice of Allowance dated Sep. 15, 2017 for the corresponding Korean Patent Application No. 10-2013-0041725.

* cited by examiner

RECHARGEABLE BATTERY AND RECHARGEABLE BATTERY MODULE INCLUDING THE SAME

CROSS-REFERENCE TO RELATED APPLICATION

Korean Patent Application No. 10-2013-0041725, filed on Apr. 16, 2013, in the Korean Intellectual Property Office, and entitled: "Rechargeable Battery and Module of the Same," is incorporated by reference herein in its entirety.

BACKGROUND

1. Field

Embodiments relate to a rechargeable battery and a rechargeable battery module including the same.

2. Description of the Related Art

A rechargeable battery is a battery that can be repeatedly charged and discharged, unlike a primary battery. A low-capacity rechargeable battery may be used for small portable electronic devices, e.g., a mobile phone, a notebook computer, and a camcorder. A large-capacity rechargeable battery may be used as a power supply for driving a motor such as a hybrid car.

For example, the rechargeable battery may include an electrode assembly for performing charging and discharging, a case accommodating the electrode assembly, a cap plate coupled to an opening of the case, and an electrode terminal electrically connected to the electrode assembly and installed in a terminal hole of the cap plate. The electrode terminal may be formed as a bolt type or plate type.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery and a rechargeable battery module including the same.

The embodiments may be realized by providing a rechargeable battery including an electrode assembly; a case accommodating the electrode assembly; a cap plate closing and sealing an opening of the case; and electrode terminals electrically connected to the electrode assembly and disposed in terminal holes of the cap plate, at least part of the electrode terminals being exposed outside of the cap plate, wherein each of the electrode terminals includes a base portion facing the cap plate; and a coupling portion protruding from at least one part of a top of the base portion, the coupling portion being coupleable to a bus bar by press-fitting.

Each coupling portion may include protrusions protruding from sides of the base portion and being spaced apart from each other; and a press-fit recess on a top surface of the base portion and between the protrusions.

Inner side surfaces of the press-fit recess may include an eleventh gap and a twelfth gap therebetween, the eleventh gap being adjacent to the base portion, the twelfth gap being spaced at a distance from the base portion and having a width wider than the eleventh gap.

Each coupling portion may include press-fit protrusions protruding from one side of the base portion.

Outer side surfaces of each press-fit protrusion may include an eleventh width and a twelfth width therebetween, the eleventh width being adjacent to the base portion, and the twelfth width being spaced at a distance from the base portion and being narrower than the eleventh width.

The electrode terminals may include a first electrode terminal connected to a first electrode of the electrode assembly; and a second electrode terminal connected to a second electrode of the electrode assembly, the coupling portion of the first electrode terminal may include protrusions protruding from sides of the base portion, and being spaced apart from each other; and a press-fit recess on a top surface of the base portion and between the protrusions, and the coupling portion of the second electrode terminal may include a press-fit protrusion protruding from one side of the base portion.

Inner side surfaces of the press-fit recess of the coupling portion at the first electrode terminal may include an eleventh gap and a twelfth gap therebetween, the eleventh gap being adjacent to the base portion, and the twelfth gap being spaced at a distance from the base portion and having a width wider than the eleventh gap, and outer side surfaces of the press-fit protrusion of the coupling portion at the second electrode terminal may include an eleventh width and a twelfth width therebetween, the eleventh width being adjacent to the base portion, and the twelfth width being spaced at a distance from the base portion and being narrower than the eleventh width.

Each coupling portion may include protrusions protruding from sides of the base portion, and being spaced apart from each other; engaging portions protruding to face each other from upper ends of the protrusions; and a press-fit recess on a top surface of the base portion and between the protrusions and the engaging portions.

The embodiments may also be realized by providing a rechargeable battery module including a plurality of rechargeable batteries; and a bus bar connecting electrode terminals of the rechargeable batteries, wherein each of the electrode terminals include a base portion facing a cap plate; and a coupling portion protruding from at least one part of a top of the base portion, the bus bar includes a plate portion facing the electrode terminals; and a coupled portion extending from the plate portion, corresponding to the coupling portion, and being coupled to the coupling portion by press-fitting.

Each coupling portion may include protrusions protruding from sides of the base portion and being spaced apart from each other; and a press-fit recess on a top surface of the base portion and between the protrusions, and the coupled portion of the bus bar may include a press-fit protrusion, the press-fit protrusion being coupled to the press-fit recess and corresponding to the press-fit recess.

Inner side surfaces of the press-fit recess of each coupling portion may include an eleventh gap and a twelfth gap therebetween, the eleventh gap being adjacent to the base portion, and the twelfth gap being spaced at a distance from the base portion and having a width wider than the eleventh gap, and outer side surfaces of the press-fit protrusion of the coupled portion may include a twenty-first width and a twenty-second width therebetween, the twenty-first width corresponding to the twelfth gap and being adjacent to the plate, the twenty-second width being narrower than the twenty-first width, corresponding to the eleventh gap, and being spaced at a distance from the plate.

The coupling portion may include press-fit protrusions that protrude from one side of the base portion, and the coupled portion of the bus bar may include press-fit recesses that are coupled to the press-fit protrusions and that correspond to the press-fit protrusions.

Outer side surfaces of each of the press-fit protrusions of each coupling portion may include an eleventh width and a twelfth width therebetween, the eleventh width being adjacent to the base portion, and the twelfth width being spaced at a distance from the base portion and being narrower than the eleventh width, and inner side surfaces of the press-fit recess of the coupled portion may include a twenty-first gap and a twenty-second gap, the twenty-first gap corresponding to the twelfth width and being adjacent to the plate, and the twenty-second gap being wider than the twenty-first gap, corresponding to the eleventh width, and being spaced at a distance from the plate.

The electrode terminals may include a first electrode terminal connected to a first electrode of an electrode assembly; and a second electrode terminal connected to a second electrode of the electrode assembly, the coupling portion of the first electrode terminal includes protrusions protruding from sides of the base portion, and being spaced apart from each other; and a press-fit recess on a top surface of the base portion and between the protrusions, a first electrode terminal region of the coupled portion of the bus bar includes a press-fit protrusion that is coupled to the press-fit recess and that corresponds to the press-fit recess, the coupling portion of the second electrode terminal includes a press-fit protrusion protruding from one side of the base portion, and a second electrode terminal region of the coupled portion of the bus bar includes a press-fit recess that is coupled to the press-fit protrusion and that corresponds to the press-fit protrusion.

Inner side surfaces of the press-fit recess of the coupling portion at the first electrode terminal may include an eleventh gap and a twelfth gap therebetween, the eleventh gap being adjacent to the base portion, and the twelfth gap being wider than the eleventh gap and being spaced at a distance from the base portion, outer side surfaces of the press-fit protrusion of the coupled portion may include a twenty-first width and a twenty-second width therebetween, the twenty-first width corresponding to the twelfth gap and being adjacent to the plate, and the twenty-second width being narrower than the twenty-first width, corresponding to the eleventh gap, and being spaced at a distance from the plate, outer side surfaces of the press-fit protrusion of the coupling portion at the second electrode terminal may include an eleventh width and a twelfth width, the eleventh width being adjacent to the base portion, and the twelfth width being narrower than the eleventh width and being spaced at a distance from the base portion, and inner side surfaces of the press-fit recess of the coupled portion may include a twenty-first gap and a twenty-second gap therebetween, the twenty-first gap corresponding to the twelfth width and being adjacent to the plate, and the twenty-second gap being wider than the twenty-first gap, corresponding to the eleventh width, and being spaced at a distance from the plate.

The coupling portion may include protrusions protruding from sides of the base portion, and being spaced apart from each other; engaging portions protruding to face each other from upper ends of the protrusions; and a press-fit recess on a top surface of the base portion and between the protrusions and the engaging portions, and the coupled portion of the bus bar includes engaged portions that correspond to the press-fit recesses and are engaged with the engaging portions.

The electrode terminals may include a first electrode terminal connected to a first electrode of the electrode assembly; and a second electrode terminal connected to a second electrode of the electrode assembly, the coupling portion may include protrusions protruding from both sides of the base portion and spaced apart from each other; and a press-fit recess on a top surface of the base portion and between the protrusions, and the coupled portion of the bus bar may include a press-fit protrusion that is coupled to the press-fit recess and corresponds to the press-fit recess, a press-fit protrusion sequentially corresponding to the press-fit recess of the first electrode terminal and the press-fit recess of the second electrode terminal.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
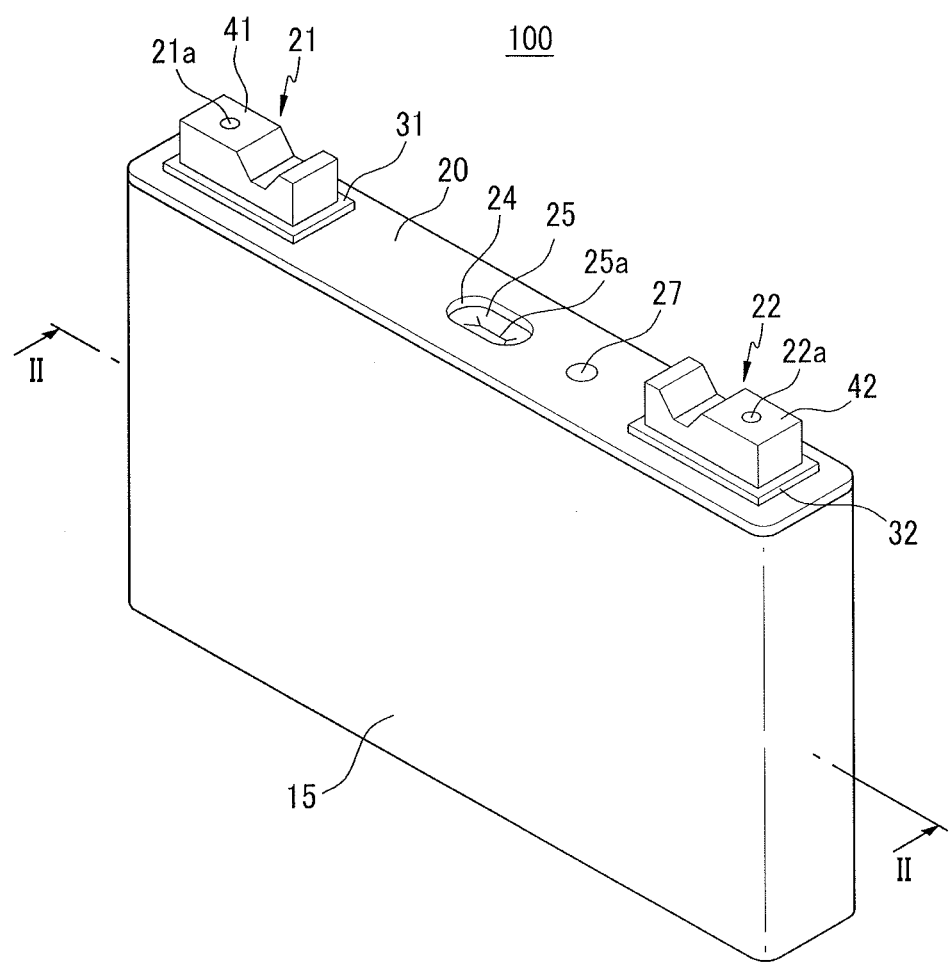
FIG. 1 illustrates a perspective view of a rechargeable battery in accordance with a first exemplary embodiment.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present.

The embodiments will be described more fully hereinafter with reference to the accompanying drawings, in which exemplary embodiments of the invention are shown. As those skilled in the art would realize, the described embodiments may be modified in various different ways, all without departing from the spirit or scope of the embodiments. In describing the embodiments, parts that are not related to the description will be omitted. Like reference numerals generally designate like elements throughout the specification.

Figure 2:
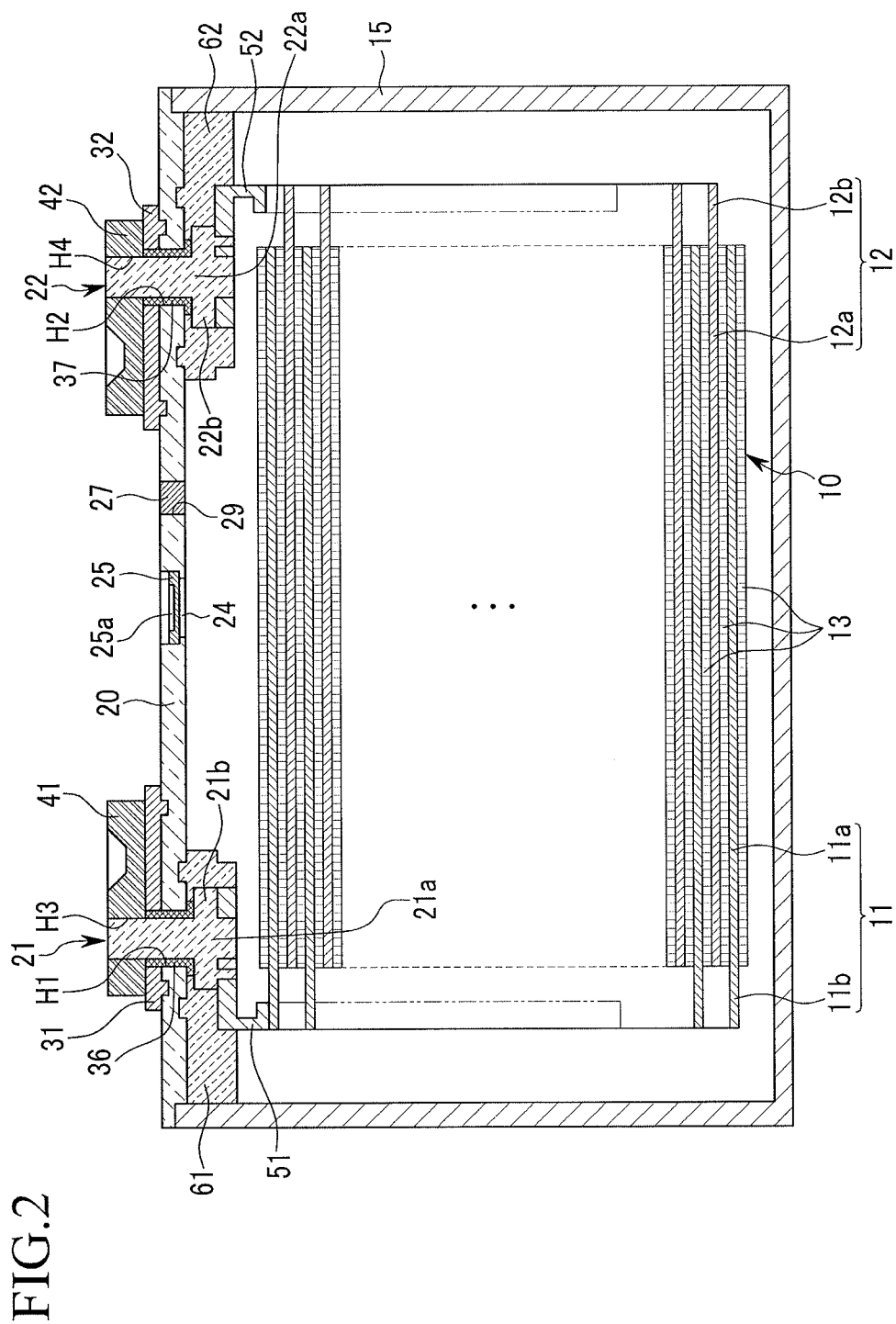
FIG. 2 illustrates a cross-sectional view taken along line II-II of FIG. 1.

FIG. 1 illustrates a perspective view of a rechargeable battery in accordance with a first exemplary embodiment. FIG. 2 illustrates a cross-sectional view taken along line II-II of FIG. 1. Referring to FIG. 1 and FIG. 2, a rechargeable battery 100 in accordance with an exemplary embodiment may include an electrode assembly 10 for performing charging and discharging, a case 15 accommodating the electrode assembly 10, a cap plate 20 coupled to an opening of the case 15, and a first electrode terminal (e.g., negative terminal 21) and a second electrode terminal (e.g., positive terminal 22) installed on the cap plate 20.

For example, the electrode assembly 10 may be formed by disposing electrodes (e.g., a negative electrode 11 and a positive electrode 12) on both surfaces of the separator 13, which is an insulator, and winding the negative electrode 11, the separator 13, and the positive electrode 12 in a jelly-roll shape.

The negative and positive electrodes 11 and 12 may include coated regions 11a and 12a, formed by applying an active material to a current collector of a metal plate, and uncoated regions 11b and 12b, which are exposed portions of the current collector to which the active material is not applied.

The uncoated region 11b of the negative electrode 11 may be formed at one end of the negative electrode 11 along the wound negative electrode 11. The uncoated region 12b of the positive electrode 12 may be formed at one end of the positive electrode 12 along the wound positive electrode 12. The uncoated regions 11b and 12b may be respectively disposed at opposite ends of the electrode assembly 10.

The case 15 may have an approximately cuboid shape so that an internal space for housing the electrode assembly 10 may be defined. An opening for connecting external and internal spaces may be formed on one side of the cuboid. The electrode assembly 10 may be inserted into the case 15 through the opening.

The cap plate 20 may be installed in the opening of the case 15 to close and seal the case 15. For example, the case 15 and the cap plate 20 may be formed of aluminum and welded to each other.

The cap plate 20 may have at least one opening, e.g., an electrolyte solution injection port 29, a vent hole 24, and terminal holes H1 and H2. The electrolyte injection opening 29 may allow an electrolyte solution to be injected into the case 15 after the cap plate 20 is coupled to the case 15. After the electrolyte solution is injected, the electrolyte solution injection port 29 may be sealed with a sealing plug 27.

The vent hole 24 may be closed and sealed with a vent plate 25 so as to discharge an internal pressure of the rechargeable battery 100 and gases generated in the rechargeable battery 100. When the internal pressure of the rechargeable battery 100 reaches or exceeds a predetermined value, the vent plate 25 may be ruptured to open the vent hole 24. The vent plate 25 may have a notch 25a for inducing the rupturing.

The negative terminal 21 may be electrically connected to the negative electrode 11 of the electrode assembly 110, and the positive terminal 22 may be electrically connected to the negative electrode 12 of the electrode assembly 10. Accordingly, the electrode assembly 10 may be drawn out of the case 15 through the negative terminal 21 and the positive terminal 22.

For example, the negative and positive terminals 21 and 22 may include outer terminals 41 and 42 provided on and exposed to the outside of the cap plate 20, corresponding to the terminal holes H1 and H2, and rivet terminals 21a and 22a electrically connected to the electrode assembly 10, and fastened to the outer terminals 41 and 42 through the terminals holes H1 and H2.

The outer terminals 41 and 42 may have through holes H3 and H4, and the rivet terminals 21a and 22a may penetrate from the top into the through holes H3 and H4 of the outer terminals 41 and 42 through the terminal holes H1 and H2. The negative and positive terminals 21 and 22 may further include flanges 21b and 22b extended integrally with the rivet terminals 21a and 22a inside the cap plate 20.

Negative and positive gaskets 36 and 37 may be disposed between the rivet terminals 21a and 22a of the positive and negative terminals 21 and 22 and the inner surfaces of the terminal holes H1 and H2 of the cap plate 20, to seal and electrically insulate between the rivet terminals 21a and 22a of the positive and negative terminals 21 and 22 and the cap plate 20.

The negative and positive gaskets 36 and 37 may be more extendedly mounted between the flanges 21b and 22b and the inner surface of the cap plate 20 to better seal and electrically insulate between the flanges 21b and 22b and the cap plate 20. The negative and positive gaskets 36 and 37 may cause the positive and negative terminals 21 and 22 to be installed on the cap plate 20 to help prevent the electrolyte from being leaked through the terminal holes H1 and H2.

Negative and positive lead tabs 51 and 52 may electrically connect the negative and positive terminals 21 and 22 to the negative and positive electrodes 11 and 12 of the electrode assembly 10. For example, the negative and positive lead tabs 51 and 52 may be connected to the lower ends of the rivet terminals 21a and 22a while being supported by the flanges 21b and 22b, by coupling the negative and positive lead tabs 51 and 52 to the lower ends of the rivet terminals 21a and 22a to caulk the bottom ends thereof.

Negative and positive insulating members 61 and 62 may be installed between the negative and positive lead tabs 51 and 52 and the cap plate 20 to electrically insulate the negative and positive lead tabs 51 and 52 from the cap plate 20.

In addition, one side of each of the negative and positive insulating members 61 and 62 may be coupled to the cap plate 20 and another side thereof may surround the negative and positive lead tabs 51 and 52, the rivet terminals 21a and 22a, and the flanges 21b and 22b, thereby stabilizing the connection structure thereof.

An external insulating member 31 may be interposed between the outer terminal 41 of the negative terminal 21 and the cap plate 20, thus electrically insulating the outer terminal 41 from the cap plate 20. For example, the cap plate 20 may remain electrically insulated from the negative terminal 21.

A conductive top plate 32 may be interposed between the outer terminal 42 of the positive terminal 22 and the cap plate 20, thus electrically insulating the outer terminal 42 from the cap plate 20. For example, the cap plate 20 may remain electrically insulated from the positive terminal 22. If the external insulating member is used instead of the top plate 32, the cap plate 20 may become electrically neutral.

The top plate 32 and the outer terminal 42 may be fastened to the upper end of the rivet terminal 22a by coupling the top plate 32 and the outer terminal 42 to the upper end of the rivet terminal 22a and riveting or welding the upper end. The outer terminal 42 may be installed at the outside of the cap plate 20, with the top plate 32 interposed between them.

The positive gasket 37 may help prevent the rivet terminal 22a and the top plate 32 from being electrically connected directly to each other. For example, the rivet terminal 22a may be electrically connected to the top plate 32 through the outer terminal 42. Accordingly, the top plate 32 and the case 15 may be anodic.

Figure 3:
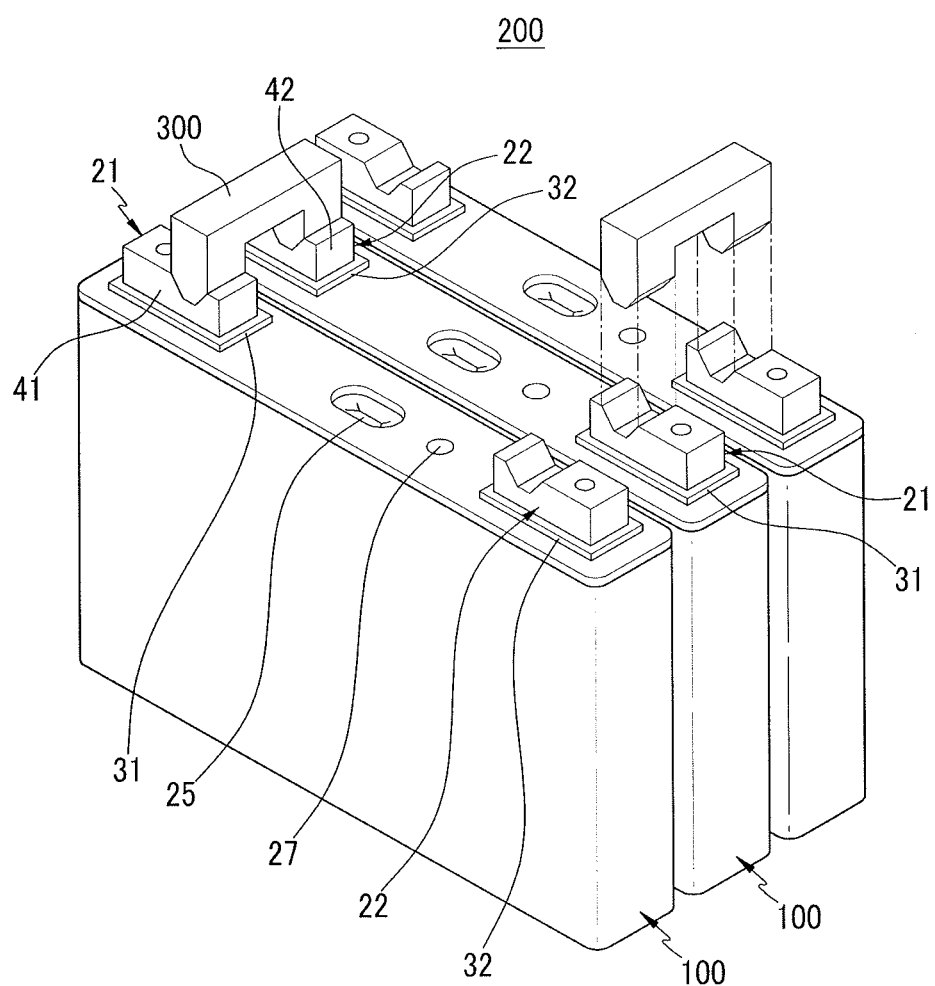
FIG. 3 illustrates a perspective view of a rechargeable battery module including the rechargeable battery of FIG. 1 in accordance with the first exemplary embodiment.

FIG. 3 illustrates a perspective view of a rechargeable battery module 200 including the rechargeable battery 100 of FIG. 1 in accordance with the first exemplary embodiment. Referring to FIG. 3, the rechargeable battery module 200 may include a plurality of rechargeable batteries 100 and a bus bar 300 connecting negative and positive terminals 21 and 22 of neighboring rechargeable batteries 100.

Figure 4:
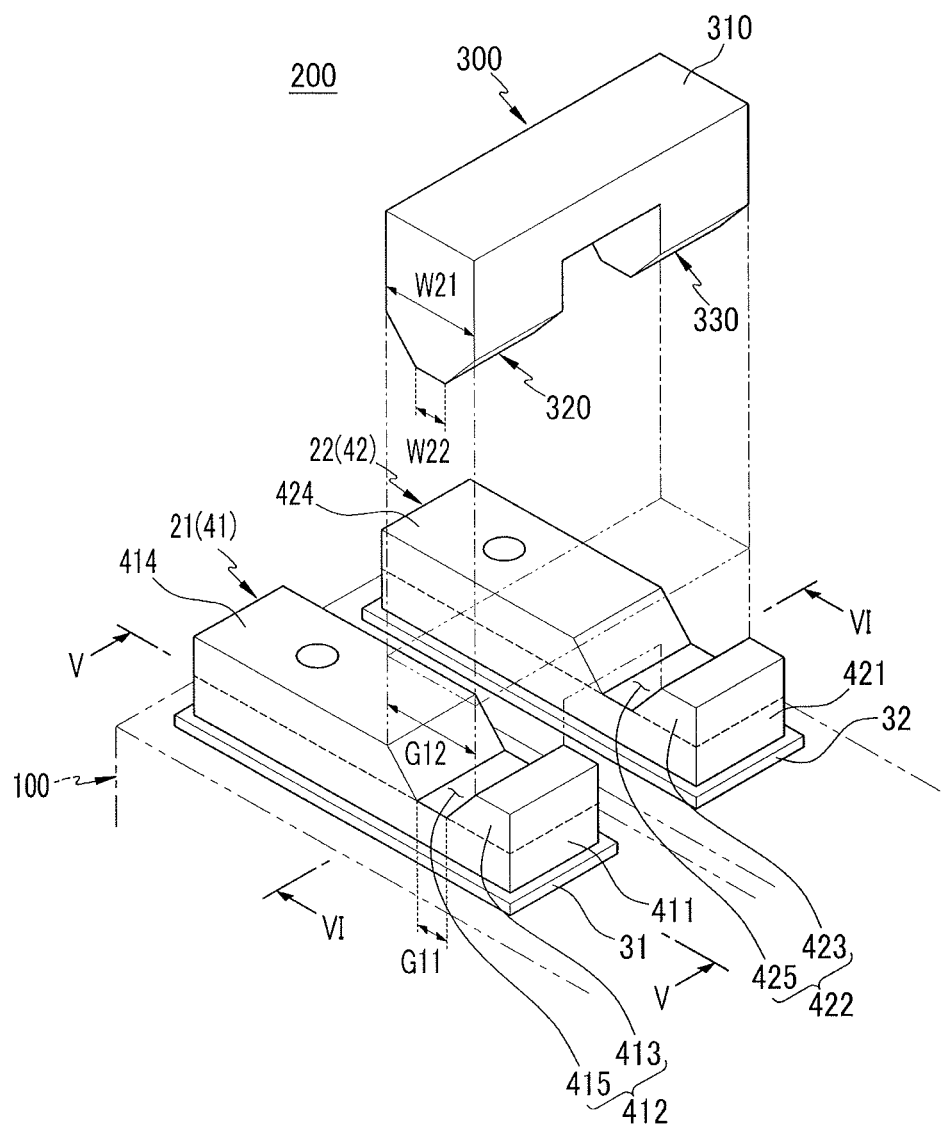
FIG. 4 illustrates an exploded perspective view of electrode terminals and a bus bar in the rechargeable battery module of FIG. 3.
Figure 5:
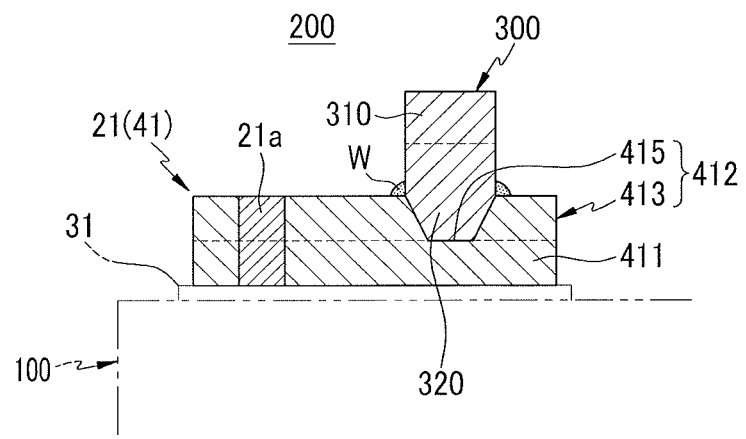
FIG. 5 illustrates a cross-sectional view of the coupling taken along line V-V of FIG. 4.
Figure 6:
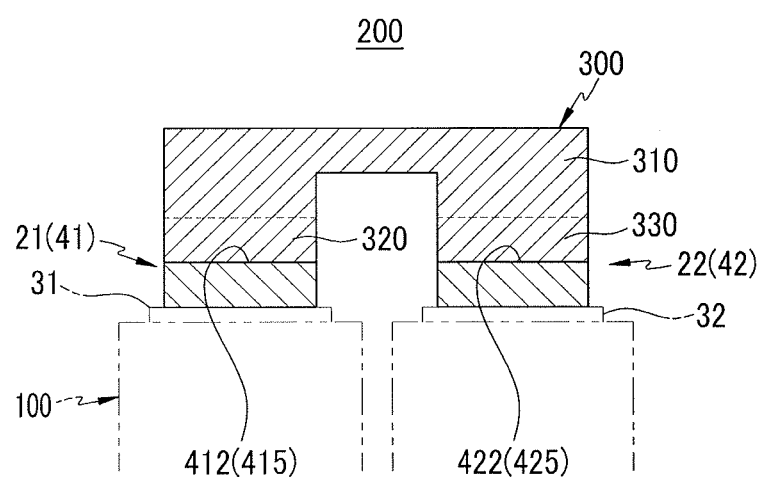
FIG. 6 illustrates a cross-sectional view of the coupling taken along line VI-VI of FIG. 4.

FIG. 4 illustrates an exploded perspective view of the electrode terminals and bus bar 300 in the rechargeable battery module 200 of FIG. 3. FIG. 5 illustrates a cross-sectional view of the coupling taken along line V-V of FIG. 4. FIG. 6 illustrates a cross-sectional view of the coupling taken along line VI-VI of FIG. 4.

Referring to FIGS. 4 to 6, the outer terminals 41 and 42 may include base portions 411 and 421 facing or adjacent to the cap plate 20 and coupling portions 412 and 422 protruding from at least one part of a top of the base portions 411 and 412. The coupling portions 412 and 422 may be coupled to the bus bar 300 by press-fitting.

For example, the coupling portions 412 and 422 of the outer terminals 41 and 42 may include protrusions 413 and 414 and 423 and 424 protruding from sides, e.g., both sides, of the base portions 411 and 421, and spaced apart from each other. Press-fit recesses 415 and 425 may be between the protrusions 413 and 414 and 423 and 424 to correspond to the top surfaces of the base portions 411 and 421 and the inner side surfaces of the protrusions 413 and 414 and 423 and 424. The protrusions 413 and 414 and 423 and 424 may protrude from the base portions 411 and 421 and may increase a rigidity of the outer terminals 41 and 42.

The bus bar 300 may include a plate portion 310 (facing the outer terminals 41 and 42 of the negative and positive terminals 21 and 22) and a coupled portion (extending from the plate portion 310) to correspond to the coupling portions 412 and 422. The coupled portion may be press-fit and coupled to the coupling portions 412 and 422. For example, the coupled portion may be coupleable with the coupling portions 412 and 422 of the outer terminals 41 and 42. In an implementation, the coupled portion may have a shape complementary to a shape of the coupling portions 412 and 422 of the outer terminals 41 and 42.

For example, the coupled portion of the bus bar 300 may include press-fit protrusions 320 and 330 that protrude and are coupled to the press-fit recesses 415 and 425 and that correspond to the press-fit recesses 415 and 425. With the press-fit protrusions 320 and 330 press-fit into the press-fit recesses 415 and 425, the bus bar 300 may be welded (W) to the protrusions 413 and 414 and 423 and 424 of the outer terminals 41 and 42. Accordingly, the rigidity of interconnection may be improved.

The press-fit protrusions 320 and 330 of the bus bar 300 may be press-fit into the press-fit recesses 415 and 425 of the outer terminals 41 and 42 and may remain coupled to each other before welding (W). Thus, the bus bar 300 may be positioned on the outer terminals 41 and 42. Accordingly, the welding of the outer terminals 41 and 42 and the bus bar 300 may be easily done.

In the negative and positive terminals 21 and 22, the press-fit recesses 415 and 425 and the press-fit protrusions 320 and 330 of the bus bar 300 may have the same configurations. Accordingly, a detailed description will be made by taking for example the press-fit recess 415 and the press-fit protrusion 320 to be press-fit therein at the negative terminal 21.

On an inner side surface of the press-fit recess 415 of the coupling portion 412, an eleventh gap G11 may be close, adjacent, or proximate to the base portion 411, and a twelfth gap G12, wider than the eleventh gap G11, may be spaced at a distance from or may be distal to the base portion 411. For example, the eleventh gap G11 of the press-fit recess 415 may be between the twelfth gap G12 and a top of the base portion 411. For example, the press-fit recess 415 may have an approximately inverse trapezoidal shape in which a width of the press-fit recess 415 gradually increases from a position adjacent to or proximate to the base portion 411 to a position spaced apart from or distal to the base portion 411.

On an outer side surface of the press-fit protrusion 320 of the coupled portion, a twenty-first width W21 (corresponding to the twelfth gap G12) may be close, adjacent, or proximate to the plate 310, and a twenty-second width W22, narrower than the twenty-first width W21, and corresponding to the eleventh gap G11, may be spaced at a distance from or may be distal to the plate 310. For example, the twenty-first width W21 may be at an area of the press-fit protrusion 320 between the twenty-second width W22 and the plate 310. For example, the press-fit protrusion 320 may have an approximately inverse trapezoidal shape in which a width of the press-fit protrusion 320 gradually decreases from a position adjacent or proximate to the plate 310 to a position spaced apart from or distal to the plate 310.

Accordingly, when manufacturing a rechargeable battery module 200 including rechargeable batteries 100 as unit cells, the bus bar 300 may be stably positioned on the outer terminals 41 and 42 by press-fitting the press-fit protrusions 320 and 330 of the bus bar 300 into the press-fit recesses 415 and 425 of the outer terminals 41 and 42.

Also, with the press-fit protrusions 320 and 330 being press-fit in the press-fit recesses 415 and 425 of the coupling portions 412 and 422, the bus bar 300 may be welded (W) to the protrusions 412 and 414 and 423 and 414 of the outer terminals 41 and 42. Accordingly, the rigidity of connection of the outer terminals 41 and 42 and the bus bar 300 may be improved.

A variety of exemplary embodiments will be described below. Repeated description of the same components as shown and described above with respect to the first exemplary embodiment and the above-described exemplary embodiment may be omitted, and the different components will be explained.

Figure 7:
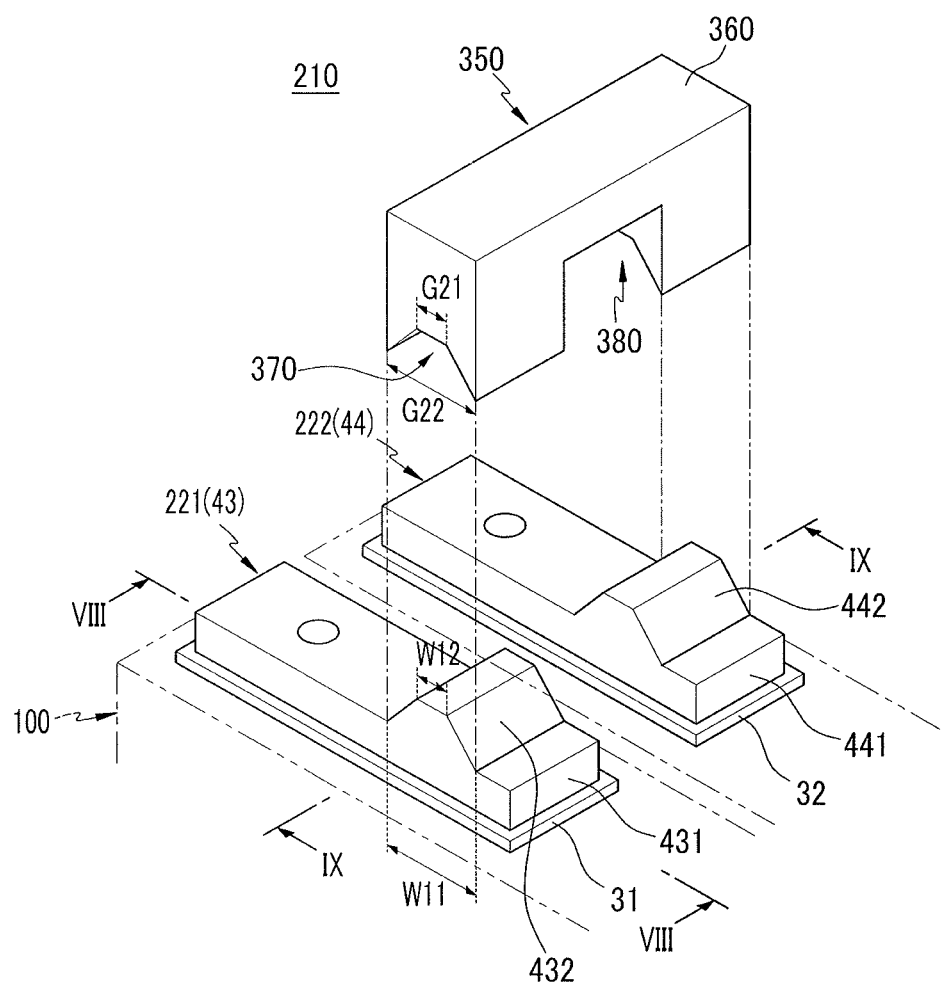
FIG. 7 illustrates an exploded perspective view of electrode terminals and a bus bar in a rechargeable battery module in accordance with a second exemplary embodiment.
Figure 8:
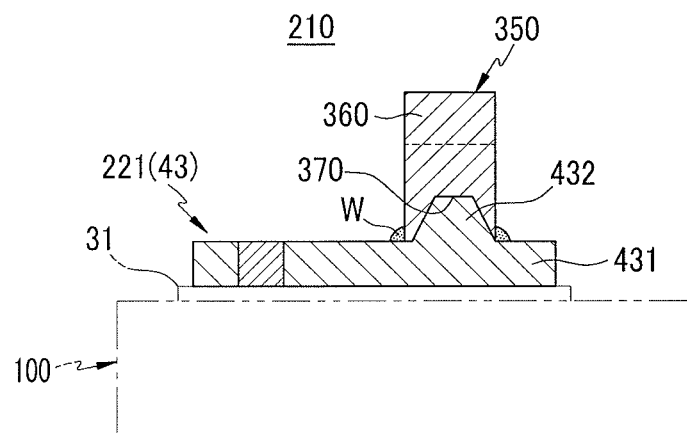
FIG. 8 illustrates a cross-sectional view of the coupling taken along line VIII-VIII of FIG. 7.
Figure 9:
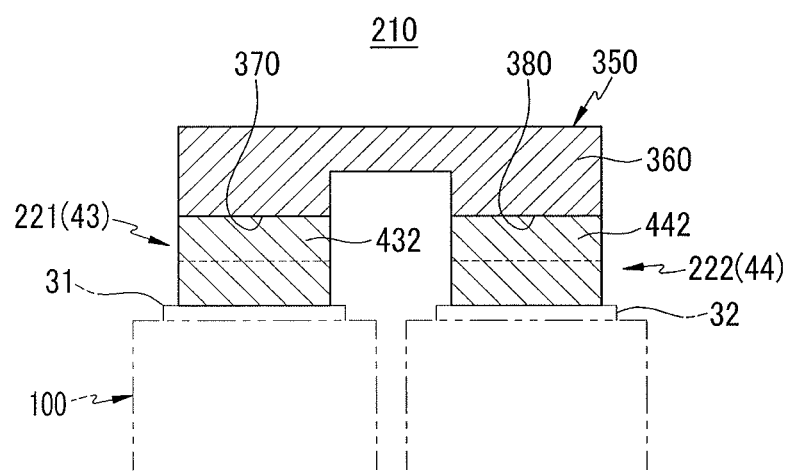
FIG. 9 illustrates a cross-sectional view of the coupling taken along line IX-IX of FIG. 7.

FIG. 7 illustrates an exploded perspective view of electrode terminals and a bus bar in a rechargeable battery module 210 in accordance with a second exemplary embodiment. FIG. 8 illustrates a cross-sectional view of the coupling taken along line VIII-VIII of FIG. 7. FIG. 9 illustrates a cross-sectional view of the coupling taken along line IX-IX of FIG. 7.

Referring to FIGS. 7 to 9, the coupling portions of the outer terminals 43 and 44 may include press-fit protrusions 432 and 442 protruding from one side of the base portions 431 and 441. The press-fit protrusions 432 and 442 may protrude from the base portions 431 and 441 and may help increase the rigidity of the outer terminals 43 and 44.

For example, the coupled portion of the bus bar 350 may include press-fit recesses 370 and 380 that are coupled to the press-fit protrusions 432 and 442, and may correspond to the press-fit protrusions 432 and 442. The bus bar 350 having the press-fit recesses 370 and 380 may be welded (W) to the base portions 431 and 441 of the outer terminals 43 and 44. Accordingly, the rigidity of interconnection may be improved. For example, the coupled portion of the bus bar 350 may be coupleable with the press-fit protrusions 432 and 442 of the outer terminals 43 and 44. In an implementation, the coupled portion may have a shape complementary to a shape of the press-fit protrusions 432 and 442 of the outer terminals 43 and 44.

The press-fit protrusions 432 and 442 of the outer terminals 43 and 44 may be press-fit into the press-fit recesses 370 and 380 of the bus bar 350 and may remain coupled to each other before welding (W). Thus, the bus bar 350 can be positioned on the outer terminals 43 and 44. Accordingly, the welding of the outer terminals 43 and 44 and the bus bar 350 can be easily done.

A detailed description will be made by taking for example the press-fit recess 432 and the press-fit protrusion 370 to be press-fit therein at the negative terminal 221.

On an outer side surface of the press-fit protrusion 432 of a coupling portion, an eleventh width W11 may be close to, adjacent to, or proximate to the base portion 431, and a twelfth width W12, narrower than the eleventh width W11, may be spaced at a distance from or may be distal to the base portion 431. For example, the eleventh width W11 may be at an area of the press-fit protrusion 432 between the twelfth width W12 and the base portion 431. For example, the press-fit protrusion 432 may have an approximately trapezoidal shape in which a width of the press-fit protrusion 432 gradually decreases from a position adjacent or proximate to the base portion 431 to a position distal to the base portion 431.

On an inner side surface of the press-fit recess 370 of the coupled portion, a twenty-first gap G21 (corresponding to the twelfth width W12) may be close to, adjacent to, or proximate to the plate 360, and a twenty-second gap G22, wider than the twenty-first gap G21, and corresponding to the eleventh width W11, may be spaced at a distance from or may be distal to the plate 360. For example, the twenty-first gap G21 of the press-fit recess 370 may be between the twenty-second gap G22 and the plate 360. For example, the press-fit recess 370 may have an approximately trapezoidal shape in which a width of the press-fit recess 370 gradually increases from a position adjacent or proximate to the plate 360 to a position distal to the plate 360.

Accordingly, when manufacturing a rechargeable battery module 210 including rechargeable batteries 100 as unit cells, the bus bar 350 may be stably positioned on the outer terminals 43 and 44 by press-fitting the press-fit protrusions 432 and 442 of the outer terminals 43 and 44 into the press-fit recesses 370 and 380 of the bus bar 350.

Also, with the press-fit protrusions 432 and 442 being press-fit in the press-fit recesses 370 and 380 of the coupled portion, the bus bar 350 may be welded (W) to the base portions 431 and 441 of the outer terminals 43 and 44. Accordingly, the rigidity of connection of the outer terminals 43 and 44 and the bus bar 350 may be improved.

Figure 10:
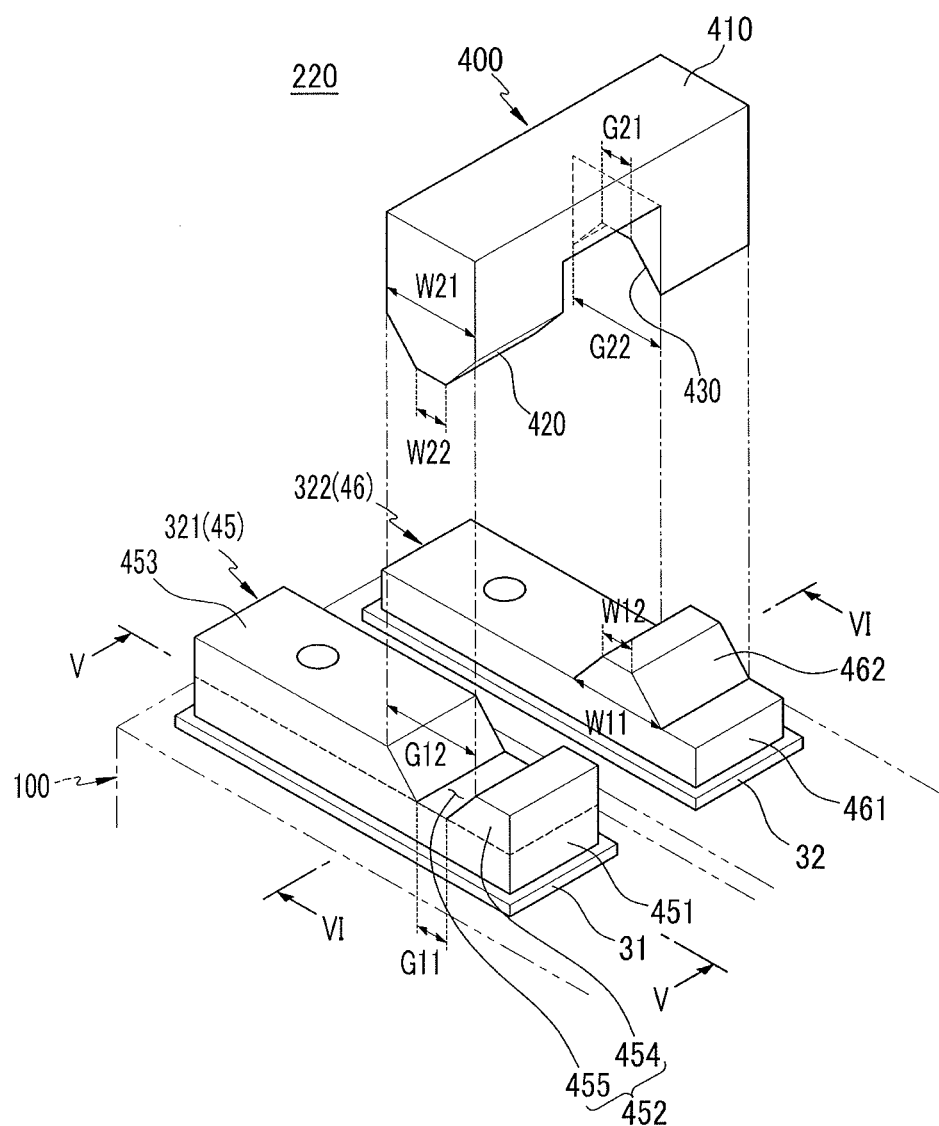
FIG. 10 illustrates an exploded perspective view of electrode terminals and a bus bar in a rechargeable battery module in accordance with a third exemplary embodiment.
Figure 11:
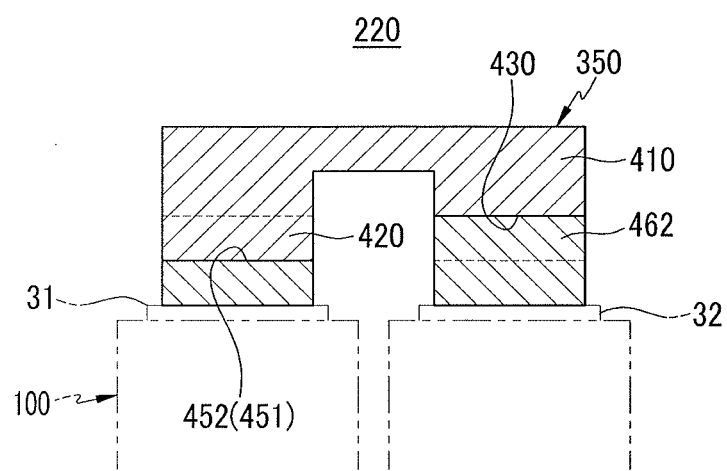
FIG. 11 illustrates a cross-sectional view of the coupling taken along line XI-XI of FIG. 10.

FIG. 10 illustrates an exploded perspective view of electrode terminals and a bus bar in a rechargeable battery module 220 in accordance with a third exemplary embodiment. FIG. 11 illustrates a cross-sectional view of the coupling taken along line XI-XI of FIG. 10.

While the negative terminal 21 and 221 and the positive terminal 22 and 222 are of the same structure in the first and second exemplary embodiments, the negative terminal 321 and the positive terminal 322 are of different structures in the third exemplary embodiment.

For example, the coupling portion of the negative terminal 321 and the corresponding region of the coupled portion of the bus bar 400 may be identical to those of the first exemplary embodiment, and the coupling portion of the positive terminal 322 and the corresponding region of the coupled portion of the bus bar 400 may be identical to those of the second exemplary embodiment.

The coupling portion 452 of the outer terminal 45 at the negative terminal 321 may include protrusions 453 and 454 protruding from sides, e.g., both sides, of the base portion 451 and spaced apart from each other, and a press-fit recess 455 between the protrusions 453 and 454 to correspond to the top surface of the base portion 451 and the inner side surfaces of the protrusions 453 and 454. The protrusions 453 and 454 may protrude from the base portion 451 and may help increase the rigidity of the outer terminal 45.

A region of the coupled portion of the bus bar 400 corresponding to the negative terminal 321, e.g., a negative electrode terminal region, may include a press-fit protrusion 420 that protrudes and is coupled to the press-fit recess 455 and corresponds to the press-fit recess 455. The region of the bus bar 400 corresponding to the press-fit protrusion 420 to be press-fit into the press-fit recess 445 may be welded to the protrusions 453 and 454 of the outer terminal 45. Accordingly, the rigidity of interconnection may be improved.

The coupling portion of the outer terminal 46 at the positive terminal 322 may include a press-fit protrusion 462 that protrudes from one side of the base portion 461. The press-fit protrusion 462 may protrude from the base portion 461 and may help increase the rigidity of the outer terminal 46.

A region of the coupled portion of the bus bar 400 corresponding to the positive terminal 322, e.g., a positive electrode terminal region, may include a press-fit recess 430 that is coupled to the press-fit protrusion 462 to correspond to the press-fit protrusion 462. The region of the bus bar 400 corresponding to the press-fit recess 430 may be welded to the base portion 461 of the outer terminal 46. Accordingly, the rigidity of interconnection is improved.

On the inner side surface of the press-fit recess 455 of the coupling portion 452 at the negative terminal 321, an eleventh gap G11 may be close, adjacent, or proximate to the base portion 451, and a twelfth gap G12, wider than the eleventh gap G11, may be spaced at a distance from or may be distal to the base portion 451.

On the outer side surface of the press-fit protrusion 420 of the coupled portion, a twenty-first width W21 (corresponding to the twelfth gap G12) may be close, adjacent, or proximate to the plate 410, and a twenty-second width W22, narrower than the twenty-first width W21, and corresponding to the eleventh gap G11, may be spaced at a distance from or may be distal the plate 410.

On the outer side surface of the press-fit protrusion 462 of the coupling portion at the positive terminal 322, an eleventh width W11 may be close, adjacent, or proximate to the base portion 461, and a twelfth width W12, narrower than the eleventh width W11, may be spaced at a distance from or may be distal the base portion 461.

On the outer side surface of the press-fit recess 430 of the coupled portion, a twenty-first gap G21 corresponding to the twelfth width W12 may be close, adjacent, or proximate to the plate 410, and a twenty-second gap G22, wider than the twenty-first gap G21, and corresponding to the eleventh width W11, may be spaced at a distance from or may be distal to the plate 410.

Accordingly, when manufacturing a rechargeable battery module 220 including rechargeable batteries 100 as unit cells, the bus bar 400 may be stably positioned on the outer terminals 45 and 46 by press-fitting the press-fit protrusion 420 and press-fit recess 430 of the bus bar 400 into the press-fit recess 455 of the outer terminal 45 and the press-fit protrusion 462 of the outer terminal 46.

Also, the bus bar 400 may be welded to the protrusions 453 and 454 of the outer terminal 45, with the press-fit protrusion 420 being press-fit in the press-fit recess 455 corresponding to the coupling portion 452. The bus bar 400 may be welded to the base portion 461 of the outer terminal 46, with the press-fit protrusion 462 being press-fit in the press-fit recess 430 of the coupled portion. Accordingly, the rigidity of connection of the outer terminals 45 and 46 and the bus bar 400 may be improved.

Figure 12:
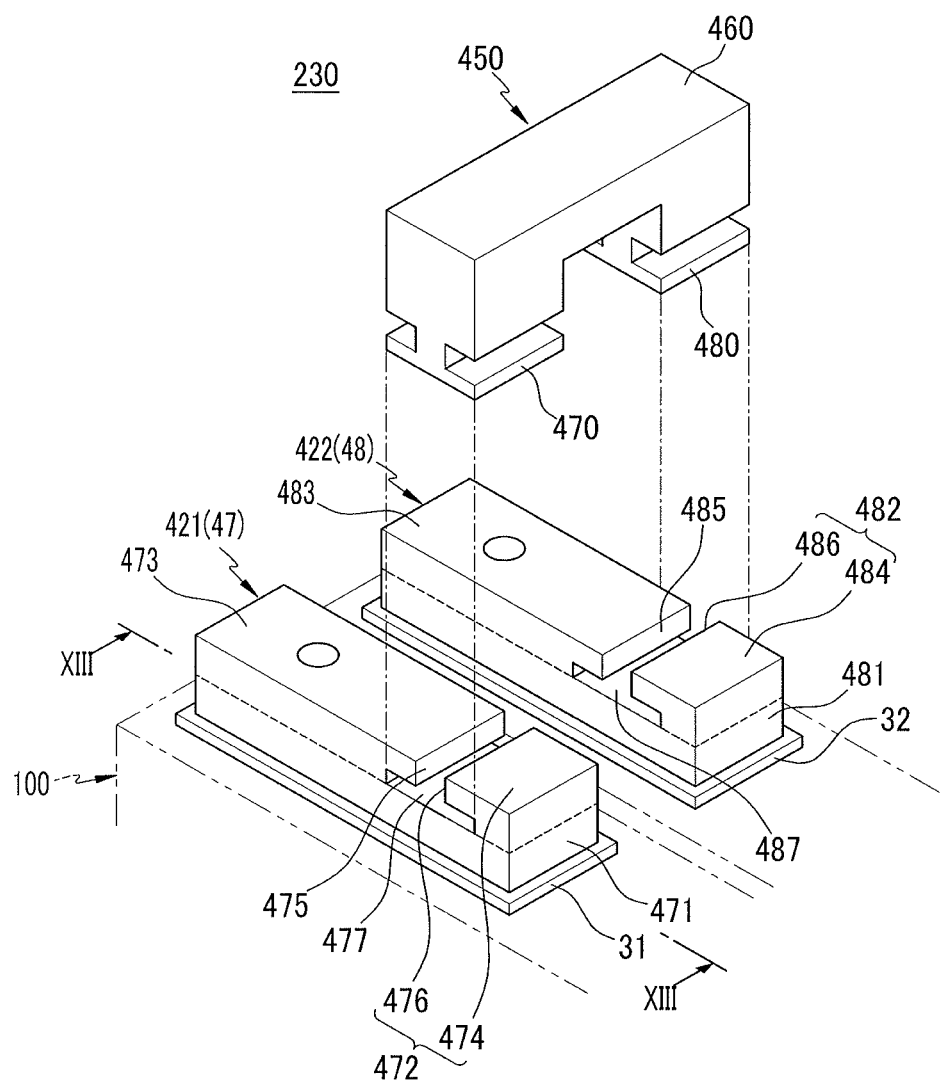
FIG. 12 illustrates an exploded perspective view of electrode terminals and a bus bar in a rechargeable battery module in accordance with a fourth exemplary embodiment.
Figure 13:
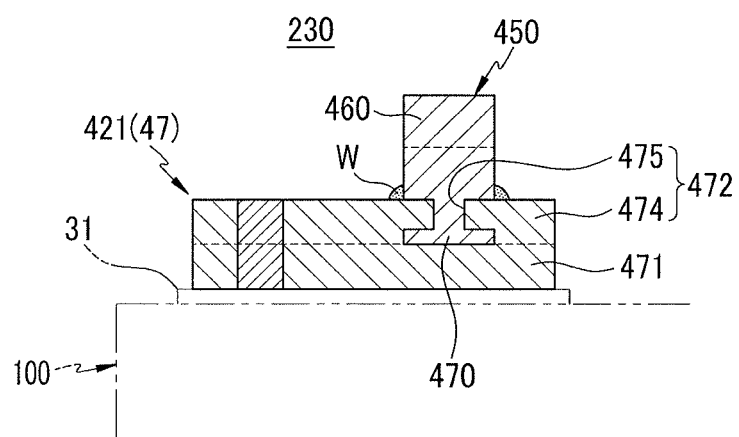
FIG. 13 illustrates a cross-sectional view of the assembled state taken along line XIII-XIII of FIG. 12.

FIG. 12 illustrates an exploded perspective view of electrode terminals and a bus bar in a rechargeable battery module 230 in accordance with a fourth exemplary embodiment. FIG. 13 illustrates a cross-sectional view of the assembled state taken along line XIII-XIII of FIG. 12.

While the first to third exemplary embodiments are configured such that the bus bar 300, 350, and 400 is vertically press-fit into the outer terminals 41 and 42, 43 and 44, and 45 and 46, the present embodiment is configured such that the bus bar 450 is horizontally press-fit into the outer terminals 47 and 48.

Referring to FIGS. 12 and 13, the coupling portions 472 and 482 of the outer terminals 47 and 48 may include: protrusions 473 and 474 and 483 and 484 protruding from sides, e.g., both sides, of the base portions 471 and 481 and spaced apart from each other; engaging portions 475 and 476 and 485 and 486 protruding to face each other from upper ends of the protrusions 473 and 474 and 483 and 484; and press-fit recesses 477 and 487 on top surfaces of the base portions 471 and 481 to correspond to inner side surfaces of the protrusions 473 and 474 and 483 and 484 and engaging portions 475 and 476 and 485 and 486. The protrusions 473 and 474 and 483 and 484 and the engaging portions 475 and 476 and 485 and 486 may protrude from the base portions 471 and 481 and may help increase the rigidity of the outer terminals 47 and 48.

For example, the coupled portion of the bus bar 450 may include press-fit protrusions 470 and 480 that protrude and that are horizontally coupled to the press-fit recesses 477 and 487 by press-fitting to correspond to the press-fit recesses 477 and 478. With the press-fit protrusions 470 and 480 press-fit into the press-fit recesses 477 and 487, the bus bar 450 may be welded (W) to the engaging portions 475 and 476 and 485 and 486 of the outer terminals 47 and 48. Accordingly, the rigidity of interconnection may be improved. In an implementation, the press-fit protrusions 470 and 480 of the bus bar 450 may have a shape that is complementary to that of the press-fit recesses 477 and 478.

The press-fit protrusions 470 and 480 of the bus bar 450 may be horizontally press-fit into the press-fit recesses 477 and 487 of the outer terminals 47 and 48 and remain coupled to each other before welding (W). Thus, the bus bar 450 may be positioned on the outer terminals 47 and 48. Accordingly, the welding of the outer terminals 47 and 48 and the bus bar 450 may be easily done.

Figure 14:
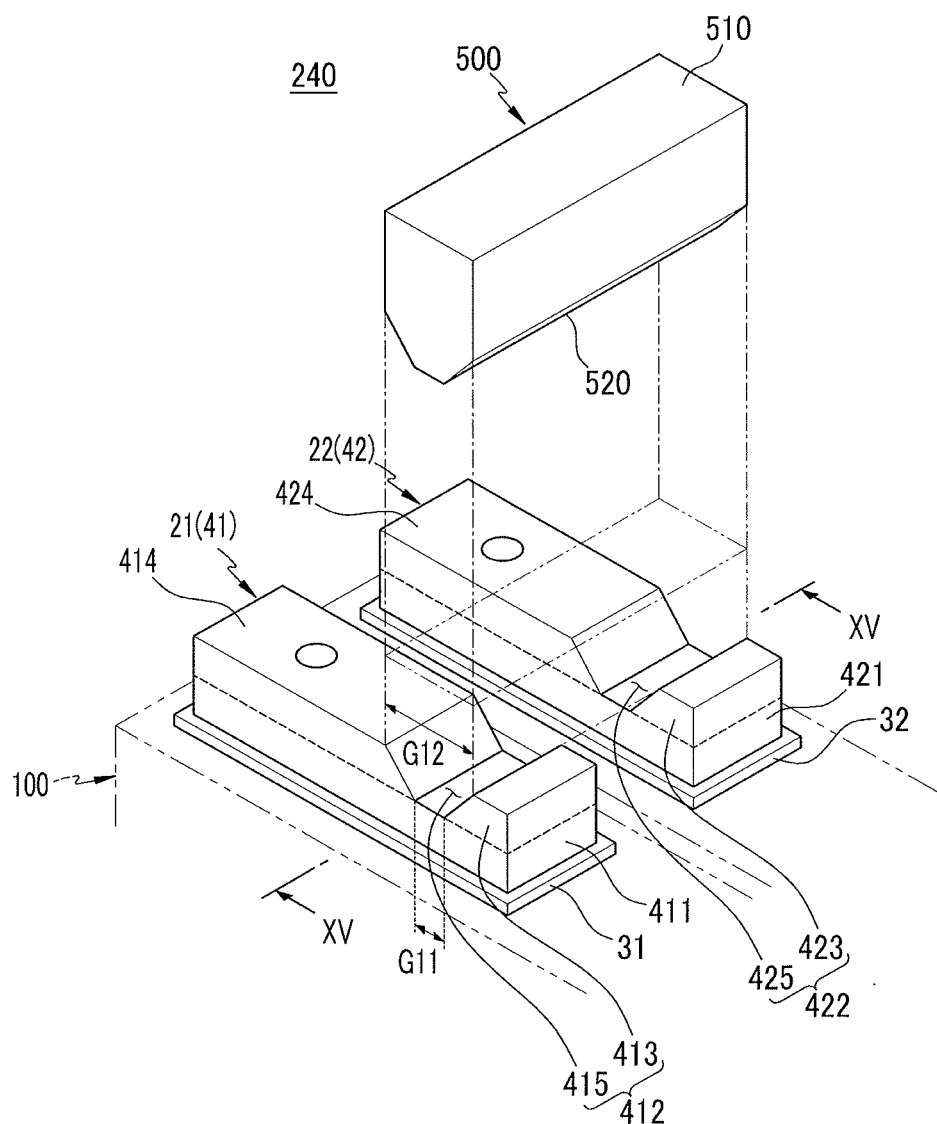
FIG. 14 illustrates an exploded perspective view of electrode terminals and a bus bar in a rechargeable battery module in accordance with a fifth exemplary embodiment.
Figure 15:
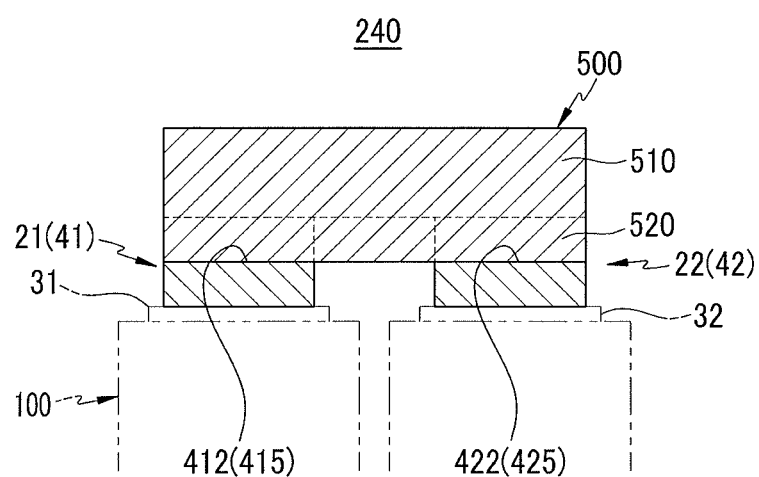
FIG. 15 illustrates a cross-sectional view of the assembled state taken along line XV-XV of FIG. 14.

FIG. 14 illustrates an exploded perspective view of electrode terminals and a bus bar in a rechargeable battery module 240 in accordance with a fifth exemplary embodiment. FIG. 15 illustrates a cross-sectional view of the assembled state taken along line XV-XV of FIG. 14.

Referring to FIGS. 14 and 15, the coupled portion of the bus bar 500 may include a press-fit protrusion 520 that is coupled to press-fit recesses 415 and 425 and that corresponds to the press-fit recesses 415 and 425. For example, the press-fit protrusion 520 that is coupled to press-fit recesses 415 and 425 may have a shape that is complementary to that of the press-fit recesses 415 and 425. The press-fit protrusion 520 may be correspondingly and sequentially coupled to the press-fit recess 415 of the outer terminal 41 at the negative terminal 21 and the press-fit recess 425 of the outer terminal 42 at the positive terminal 22.

With the press-fit protrusion 520 press-fit integrally into the press-fit recesses 415 and 425, the bus bar 500 may be welded to the protrusions 413 and 414 and 423 and 424 of the outer terminals 41 and 42. Accordingly, the rigidity of interconnection may be improved.

The press-fit protrusion 520 of the bus bar 500 may be press-fit into the press-fit recesses 415 and 425 of the outer terminals 41 and 42 and may remain coupled to each other before welding (W). Thus, the bus bar 500 may be positioned on the outer terminals 41 and 42. Accordingly, the welding of the outer terminals 41 and 42 and the bus bar 450 may be easily done.

By way of summation and review, a rechargeable battery module may be formed by connecting electrode terminals of unit cells, which include rechargeable batteries, in series or in parallel, by a bus bar. The bus bar used for the plate-type electrode terminals may have a plate-like shape, and may be placed and welded onto the plates of the electrode terminals.

As the plate-type bus bar is installed on the plates of the electrode terminals, a position of the bus bar may not be fixed. Thus, it may be difficult to weld the bus bar and to ensure sufficient rigidity to connect the plates of the electrode terminals and the bus bar.

The embodiments provide a rechargeable battery that facilitates welding of a bus bar by positioning and fixing the bus bar, and helps ensure there is sufficient rigidity to connect electrode terminals and the bus bar.

According to an embodiment, the bus bar may be positioned on the electrode terminals because the bus bar may be coupled to the coupling portions protruding from the top of the base portions of the electrode terminals. Accordingly, welding of the bus bar can be easily done, and the rigidity of connection of the electrode terminals and the bus bar may be attained because of the protruding coupling portions.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
an electrode assembly;

a case accommodating the electrode assembly;
a cap plate closing and sealing an opening of the case; and
electrode terminals electrically connected to the electrode assembly and disposed in terminal holes of the cap plate, at least part of the electrode terminals being exposed outside of the cap plate,
wherein:
each of the electrode terminals includes:
a base portion facing the cap plate; and
a coupling portion protruding from at least one part of a top of the base portion, the coupling portion being coupleable to a bus bar by press-fitting,
the coupling portion includes one of a press-fit protrusion or a press-fit recess,
the bus bar includes one of a press-fit recess or a press-fit protrusion,
the press-fit protrusion is slightly larger than the press-fit recess to facilitate the press-fitting, and
the press-fit protrusion has a trapezoidal shape having inclined sides and the press-fit recess has a complementary trapezoidal shape having inclined sides.

2. The rechargeable battery as claimed in claim 1, wherein each coupling portion includes:
protrusions protruding from sides of the base portion and being spaced apart from each other; and
a press-fit recess on a top surface of the base portion and between the protrusions.

3. The rechargeable battery as claimed in claim 2, wherein, inner side surfaces of the press-fit recess include an eleventh gap and a twelfth gap therebetween, the eleventh gap being adjacent to the base portion, the twelfth gap being spaced at a distance from the base portion and having a width wider than the eleventh gap.

4. The rechargeable battery as claimed in claim 1, wherein each coupling portion includes press-fit protrusions protruding from one side of the base portion.

5. The rechargeable battery as claimed in claim 4, wherein, outer side surfaces of each press-fit protrusion include an eleventh width and a twelfth width therebetween, the eleventh width being adjacent to the base portion, and the twelfth width being spaced at a distance from the base portion and being narrower than the eleventh width.

6. The rechargeable battery as claimed in claim 1, wherein:
the electrode terminals include:
a first electrode terminal connected to a first electrode of the electrode assembly; and
a second electrode terminal connected to a second electrode of the electrode assembly,
the coupling portion of the first electrode terminal includes:
protrusions protruding from sides of the base portion, and being spaced apart from each other; and
a press-fit recess on a top surface of the base portion and between the protrusions, and
the coupling portion of the second electrode terminal includes a press-fit protrusion protruding from one side of the base portion.

7. The rechargeable battery as claimed in claim 6, wherein:
inner side surfaces of the press-fit recess of the coupling portion at the first electrode terminal include an eleventh gap and a twelfth gap therebetween, the eleventh gap being adjacent to the base portion, and the twelfth gap being spaced at a distance from the base portion and having a width wider than the eleventh gap, and
outer side surfaces of the press-fit protrusion of the coupling portion at the second electrode terminal include an eleventh width and a twelfth width therebetween, the eleventh width being adjacent to the base portion, and the twelfth width being spaced at a distance from the base portion and being narrower than the eleventh width.

8. A rechargeable battery module, comprising:
a plurality of rechargeable batteries; and
a bus bar connecting electrode terminals of the rechargeable batteries,
wherein:
each of the electrode terminals include:
a base portion facing a cap plate; and
a coupling portion protruding from at least one part of a top of the base portion,
the bus bar includes:
a plate portion facing the electrode terminals; and
a coupled portion extending from the plate portion, corresponding to the coupling portion, and being coupled to the coupling portion by press-fitting,
the coupling portion of the electrode terminal includes one of a press-fit protrusion or a press-fit recess,
the coupled portion of the bus bar includes one of a press-fit recess or a press-fit protrusion, and
the press-fit protrusion is slightly larger than the press-fit recess to facilitate the press-fitting, and
the press-fit protrusion has a trapezoidal shape having inclined sides and the press-fit recess has a complementary trapezoidal shape having inclined sides.

9. The rechargeable battery module as claimed in claim 8, wherein:
each coupling portion includes:
protrusions protruding from sides of the base portion and being spaced apart from each other; and
the press-fit recess on a top surface of the base portion and between the protrusions, and
the coupled portion of the bus bar includes the press-fit protrusion, the press-fit protrusion being coupled to the press-fit recess and corresponding to the press-fit recess.

10. The rechargeable battery module as claimed in claim 9, wherein:
inner side surfaces of the press-fit recess of each coupling portion include an eleventh gap and a twelfth gap therebetween, the eleventh gap being adjacent to the base portion, and the twelfth gap being spaced at a distance from the base portion and having a width wider than the eleventh gap, and
outer side surfaces of the press-fit protrusion of the coupled portion include a twenty-first width and a twenty-second width therebetween, the twenty-first width corresponding to the twelfth gap and being adjacent to the plate, the twenty-second width being narrower than the twenty-first width, corresponding to the eleventh gap, and being spaced at a distance from the plate.

11. The rechargeable battery module as claimed in claim 8, wherein:
each coupling portion includes the press-fit protrusion that protrudes from one side of the base portion, and
each coupled portion of the bus bar includes the press-fit recess that is coupled to the press-fit protrusion and that corresponds to the press-fit protrusion.

12. The rechargeable battery module as claimed in claim 11, wherein:

outer side surfaces of each of the press-fit protrusions of each coupling portion include an eleventh width and a twelfth width therebetween, the eleventh width being adjacent to the base portion, and the twelfth width being spaced at a distance from the base portion and being narrower than the eleventh width, and inner side surfaces of the press-fit recess of the coupled portion include a twenty-first gap and a twenty-second gap, the twenty-first gap corresponding to the twelfth width and being adjacent to the plate, and the twenty-second gap being wider than the twenty-first gap, corresponding to the eleventh width, and being spaced at a distance from the plate.

13. The rechargeable battery module as claimed in claim 8, wherein:

the electrode terminals include:
a first electrode terminal connected to a first electrode of an electrode assembly; and
a second electrode terminal connected to a second electrode of the electrode assembly, the coupling portion of the first electrode terminal includes:
protrusions protruding from sides of the base portion, and being spaced apart from each other; and
the press-fit recess on a top surface of the base portion and between the protrusions, a first electrode terminal region of the coupled portion of the bus bar includes the press-fit protrusion that is coupled to the press-fit recess and that corresponds to the press-fit recess, the coupling portion of the second electrode terminal includes the press-fit protrusion protruding from one side of the base portion, and a second electrode terminal region of the coupled portion of the bus bar includes the press-fit recess that is coupled to the press-fit protrusion and that corresponds to the press-fit protrusion.

14. The rechargeable battery module as claimed in claim 13, wherein:

inner side surfaces of the press-fit recess of the coupling portion at the first electrode terminal include an eleventh gap and a twelfth gap therebetween, the eleventh gap being adjacent to the base portion, and the twelfth gap being wider than the eleventh gap and being spaced at a distance from the base portion, outer side surfaces of the press-fit protrusion of the coupled portion include a twenty-first width and a twenty-second width therebetween, the twenty-first width corresponding to the twelfth gap and being adjacent to the plate, and the twenty-second width being narrower than the twenty-first width, corresponding to the eleventh gap, and being spaced at a distance from the plate, outer side surfaces of the press-fit protrusion of the coupling portion at the second electrode terminal include an eleventh width and a twelfth width, the eleventh width being adjacent to the base portion, and the twelfth width being narrower than the eleventh width and being spaced at a distance from the base portion, and inner side surfaces of the press-fit recess of the coupled portion include a twenty-first gap and a twenty-second gap therebetween, the twenty-first gap corresponding to the twelfth width and being adjacent to the plate, and the twenty-second gap being wider than the twenty-first gap, corresponding to the eleventh width, and being spaced at a distance from the plate.

15. The rechargeable battery module as claimed in claim 8, wherein:

the coupling portion includes:
protrusions protruding from sides of the base portion, and being spaced apart from each other;
engaging portions protruding to face each other from upper ends of the protrusions; and
the press-fit recess on a top surface of the base portion and between the protrusions and the engaging portions, and the coupled portion of the bus bar includes engaged portions that correspond to the press-fit recesses and are engaged with the engaging portions.

* * * * *